US012450999B2

(12) United States Patent
Ogawa

(10) Patent No.: US 12,450,999 B2
(45) Date of Patent: Oct. 21, 2025

(54) REPORTING APPARATUS, NON-TRANSITORY COMPUTER READABLE MEDIUM, AND METHOD FOR REPORTING

(71) Applicant: FUJIFILM Business Innovation Corp., Tokyo (JP)

(72) Inventor: Masakazu Ogawa, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 437 days.

(21) Appl. No.: 17/870,930

(22) Filed: Jul. 22, 2022

(65) Prior Publication Data

US 2023/0267822 A1 Aug. 24, 2023

(30) Foreign Application Priority Data

Feb. 18, 2022 (JP) ................................ 2022-023723

(51) Int. Cl.
*G08B 21/02* (2006.01)
*G08B 25/00* (2006.01)

(52) U.S. Cl.
CPC ........... *G08B 25/006* (2013.01); *G08B 21/02* (2013.01); *G08B 25/008* (2013.01)

(58) Field of Classification Search
CPC ................................ G08B 25/00; G08B 21/02
See application file for complete search history.

(56) References Cited

U.S. PATENT DOCUMENTS

2014/0285337 A1* 9/2014 Gebhardt ............. G07C 5/0866 340/521
2018/0053394 A1 2/2018 Gersten
2021/0005086 A1* 1/2021 Cohen .................... G08G 1/166

FOREIGN PATENT DOCUMENTS

JP 2008-244732 A 10/2008
JP 2018-152121 A 9/2018
JP 2020-161018 A 10/2020
KR 10-2016-0095523 A 8/2016

OTHER PUBLICATIONS

May 16, 2023 Extended Search Report issued in European Patent Application No. 22189668.1.
Sep. 12, 2025 Office Action issued in European Patent Application No. 22189668.1.

* cited by examiner

*Primary Examiner* — Michael T Vu
(74) *Attorney, Agent, or Firm* — Oliff PLC

(57) ABSTRACT

A reporting apparatus includes: an image acquisition unit that acquires an image near the reporting apparatus; and a processor configured to, by running a program: detect an object included in the image, the object being at least one of a structure, a wild animal, or a person; and in response to determining that the object is dangerous on a basis of a state of the object, display, on a display, a report button for reporting to a report addressee associated with the object.

17 Claims, 11 Drawing Sheets

FIG. 9A

| OBJECT | LOCATION INFORMATION | ANOMALY | DANGER LEVEL | REPORT ADDRESSEE |
|---|---|---|---|---|
| AA BUILDING | XXX | FIRE | HIGH | AA POLICE |
| ROAD | BBB | MINOR DAMAGE | LOW | BB CITY OFFICE |
| ROAD | BBB | MEDIUM DAMAGE | MEDIUM | BB CITY OFFICE |
| ROAD | BBB | MAJOR DAMAGE | HIGH | BB POLICE |
| ANIMAL | CCC | DEAD | MEDIUM | CC CITY OFFICE |
| BEAR | DDD | ENCOUNTER | HIGH | DD POLICE |
| WILD ANIMAL | NO HUNTING ZONE | DEAD | LOW | APPROPRIATE AUTHORITY |
| BEAR | DDD | TRAPPED | LOW | DD CITY OFFICE |

FIG. 9B

| OBJECT | LOCATION INFORMATION | ANOMALY | URGENCY LEVEL | REPORTING METHOD |
|---|---|---|---|---|
| AA BUILDING | XXX | FIRE | HIGH | TELEPHONE |
| ROAD | BBB | MINOR DAMAGE | LOW | E-MAIL |
| ROAD | BBB | MEDIUM DAMAGE | MEDIUM | TELEPHONE |
| ROAD | BBB | MAJOR DAMAGE | HIGH | TELEPHONE |
| ANIMAL | CCC | DEAD | MEDIUM | TELEPHONE |
| BEAR | DDD | ENCOUNTER | HIGH | TELEPHONE |
| WILD ANIMAL | NO HUNTING ZONE | DEAD | HIGH | TELEPHONE |
| BEAR | DDD | TRAPPED | HIGH | TELEPHONE |

REPORTING APPARATUS, NON-TRANSITORY COMPUTER READABLE MEDIUM, AND METHOD FOR REPORTING

CROSS-REFERENCE TO RELATED APPLICATIONS

This application is based on and claims priority under 35 USC 119 from Japanese Patent Application No. 2022-023723 filed Feb. 18, 2022.

BACKGROUND

(i) Technical Field

The present disclosure relates to a reporting apparatus, a non-transitory computer readable medium, and a method for reporting.

(ii) Related Art

Japanese Unexamined Patent Application Publication No. 2008-244732 describes a mobile terminal apparatus and an emergency call system that are enabled to reduce burden on a user in urgently reporting to a designated emergency phone number. The mobile terminal apparatus includes a display, a selection unit, and a communication unit. In response to detecting an urgent report button being pressed, the display displays, on the screen, a list or icons representing the categories of urgent report addressees. In response to selection on the list or an icon, the selection unit selects an emergency phone number designated for a selected urgent report addressee, with reference to a memory in which the categories of urgent report addressees are stored in association with respective phone numbers of the urgent report addressees. The communication unit makes a phone call in such a manner as to designate the emergency phone number selected by the selection unit.

Japanese Unexamined Patent Application Publication No. 2018-152121 describes an anomaly reporting system enabled to help a manager in a place where an anomaly is detected to easily perform an operation for reporting to an appropriate report addressee. The anomaly reporting system includes an anomaly monitoring facility and a terminal apparatus. The anomaly monitoring facility has anomaly sensors installed in a facility to be monitored. The terminal apparatus is capable of communicating with the anomaly monitoring facility and is carried with a manager who manages the facility. The anomaly reporting system includes a report-addressee-information acquisition unit, a display controller, an operation decision unit, and a reporting unit. When the anomaly sensor detects an anomaly, the report-addressee-information acquisition unit acquires information regarding a report addressee associated with the facility where one of the anomaly sensors that detects the anomaly is installed. The display controller causes a software button for a reporting operation to be displayed on the display of the terminal apparatus. The operation decision unit decides that a selection operation of the software button is performed on the operation unit of the terminal apparatus operated by the manager of the facility. In response to the operation decision unit deciding that the selection operation of the software button is performed on the operation unit, the reporting unit performs an operation for reporting to the report addressee acquired by the report-addressee-information acquisition unit, on the basis of the information regarding the report addressee.

SUMMARY

In the configuration, when the anomaly sensor installed in the facility to be monitored detects an anomaly, the information regarding the report addressee associated with the facility having the anomaly sensor installed therein is acquired, and then the software button for the reporting operation is displayed on the display of the terminal apparatus. In this configuration, an applied facility is limited to the facility having the anomaly sensor installed therein, and thus it is not possible to flexibly cope with more diverse situations.

Aspects of non-limiting embodiments of the present disclosure relate to providing technology enabling quick reporting to an appropriate report addressee after detecting a dangerous situation such as the appearance of a wild animal near a human habitation, even in a place where an anomaly sensor is not installed in advance.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a reporting apparatus including: an image acquisition unit that acquires an image near the reporting apparatus; and a processor configured to, by running a program: detect an object included in the image, the object being at least one of a structure, a wild animal, or a person; and in response to determining that the object is dangerous on a basis of a state of the object, display, on a display, a report button for reporting to a report addressee associated with the object.

BRIEF DESCRIPTION OF THE DRAWINGS

An exemplary embodiment of the present disclosure will be described in detail based on the following figures, wherein:

FIG. 9A is a schematic view of a report addressee table according to the exemplary embodiment;

FIG. 9B is a schematic view of a reporting method table according to the exemplary embodiment.

DETAILED DESCRIPTION

Hereinafter, an exemplary embodiment of the present disclosure will be described.

Figure 1:
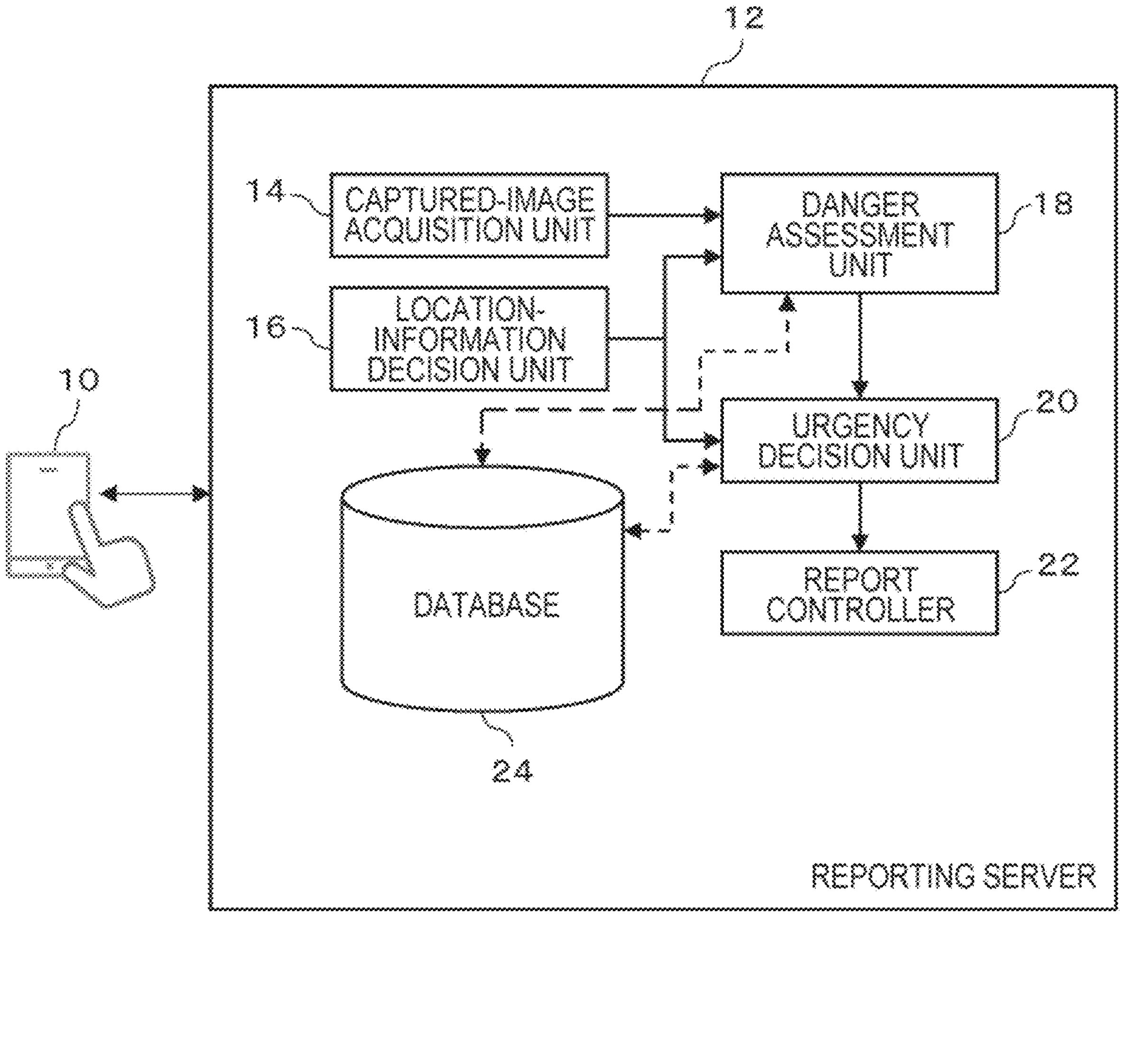
FIG. 1 is a system configuration diagram of a reporting system according to an exemplary embodiment.

FIG. 1 is a system configuration diagram of a reporting system according to this exemplary embodiment. The reporting system includes a user terminal 10 and a reporting server 12 that transmits and receives data to and from the user terminal 10.

The user terminal 10 and the reporting server 12 are connected to each other via a wired or wireless communication network. An example of the communication network is a public network such as the Internet, but a dedicated network may also be used.

The user terminal 10 is a terminal used by a user of the reporting system and is an information terminal such as a smartphone, a tablet terminal, or a personal computer (PC). Although FIG. 1 illustrates only one user terminal 10, the reporting system may include any number of user terminals 10.

The user terminal 10 includes an image capturing unit, such as a camera, that captures an image of the vicinity of the user terminal 10 and transmits the vicinity image acquired by the image capturing to the reporting server 12. The user terminal 10 also includes a location-information acquisition unit, such as a GPS, that acquires location information and transmits, to the reporting server 12, the acquired location information together with the vicinity image. The vicinity image includes both of a still image and a moving image. The location information is information regarding the location of the user terminal 10 that captures the vicinity image but, more preferably, is location information regarding an object in the vicinity image acquired by the image capturing. The object location information is acquired from the location information regarding the user terminal 10 and relative location information regarding the location of the object relative to the user terminal 10.

The reporting server 12 is a cloud server included in a cloud system and provides a reporting service. The reporting server 12 is configured from one or more server computers. The reporting server 12 functions as a reporting apparatus in this exemplary embodiment and executes a process for displaying a report button on the user terminal 10 and a process for reporting to a report addressee.

The reporting server 12 includes, as functional blocks, a captured-image acquisition unit 14, a location-information decision unit 16, a danger assessment unit 18, an urgency decision unit 20, a report controller 22, and a database 24.

The captured-image acquisition unit 14 receives the vicinity image transmitted from the user terminal 10. The captured-image acquisition unit 14 outputs the received vicinity image to the danger assessment unit 18.

The location-information decision unit 16 receives the location information transmitted from the user terminal 10. The location-information decision unit 16 may decide the object location information from the location information transmitted from the user terminal 10 and the relative location information regarding the object relative to the user terminal 10. The relative location information is acquired by performing image processing by the captured-image acquisition unit 14. The relative object location information may be acquired by, for example, a Light Detection And Ranging (LiDAR) instrument installed in the user terminal 10. Light is emitted to the object by using near infra-red light, visible light, or ultraviolet rays, light reflected from the object is seized by an optical sensor, and a distance to the object is measured. The location-information decision unit 16 outputs the decided location information to the danger assessment unit 18 and the urgency decision unit 20.

From the received vicinity image, the danger assessment unit 18 identifies the object in the image and detects an anomaly in the object on the basis of the state of the identified object. The object anomaly is decided on a per-object basis as deviation from a normal state of the object. Whether the object is in the normal state or the anomalous state may be detected in the image processing by using, for example, a trained model using learning data. In response to the detection of the object anomaly, the danger assessment unit 18 further assesses the danger level of the object. The danger level represents how much the object harms or affects the user. The danger level of the object is assessed on the basis of the anomaly level of the object. The danger level of the object may also be assessed on the basis of the anomaly level of the object and location information regarding the object. Multiple levels, for example, three levels of High, Medium, and Low may be used to assess the danger level of the object but are not limited to these. The danger level may be assessed by using numerical values ranging from 0 to 1. The danger assessment unit 18 outputs, to the urgency decision unit 20, an object having a detected anomaly and the level of the anomaly in the object and also outputs the danger level resulting from the assessment to the report controller 22.

The urgency decision unit 20 decides an urgency level on the basis of the object having the detected anomaly and the anomaly level of the object. The urgency level represents whether reporting to a report addressee is to be performed immediately.

The urgency level may be assessed on the basis of the object anomaly level and the object location information regarding the object. Multiple levels, for example, three levels of High, Medium, and Low may be used to assess the urgency level of the object but are not limited to these. The urgency level may be decided by using numerical values ranging from 0 to 1. The urgency decision unit 20 outputs the decided urgency level to the report controller 22.

The report controller 22 receives the danger level and the urgency level, decides a report addressee on the basis of the received danger level with reference to a table stored in the database 24, and also decides a reporting method (such as by telephone, e-mail, or SNS) on the basis of the received urgency level. In response to the decision of the report addressee and the reporting method for the object having the detected anomaly, the report controller 22 generates display control data for displaying a report button on the user terminal 10 and transmits the display control data to the user terminal 10. In response to receiving a signal representing the operation of the report button from the user terminal 10, the report controller 22 automatically reports to the report addressee decided in association with the report button, by the decided reporting method.

For example, in response to the user transmitting, to the reporting server 12, an image of a bear as a vicinity image captured with the camera of the user terminal 10, the captured-image acquisition unit 14 receives the image and outputs the image to the danger assessment unit 18. In addition, the location-information decision unit 16 receives GPS data attached to the image as the location information and outputs the location information to the danger assessment unit 18.

The danger assessment unit 18 identifies the bear as an object from the image. Further, since the bear is freely moving and is not in a cage or the like and the location information indicates suburbs of the urban area, not a zoo or the like, the danger assessment unit 18 detects an anomaly. Since the bear is moving, the danger assessment unit 18 regards the anomaly level as high and thus assesses the danger level as High.

Since the object is a bear and the anomaly level is high, the urgency decision unit 20 decides that the urgency level is also High.

Since the object is a bear and the danger level is high, the report controller 22 decides, as the report addressee, a police station having jurisdiction over the object location. Since the urgency level is High, the report controller 22 decides telephone as the reporting method. The report controller 22 then causes the user terminal 10 to display the report button. The user operates the report button displayed on the user terminal 10, and then the report controller 22 automatically reports to the decided report addressee by the decided reporting method in response to a signal for the operation.

Figure 2:
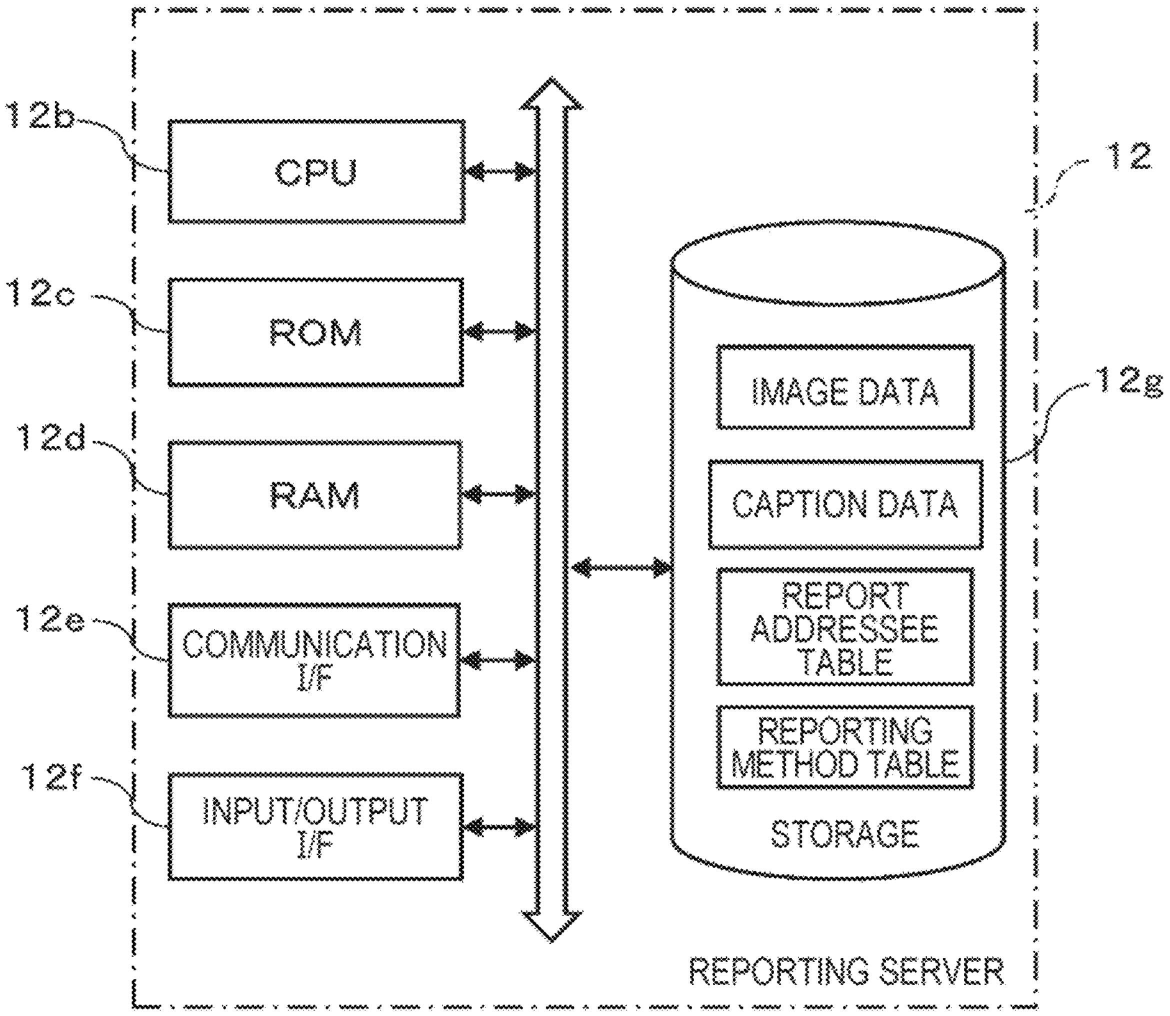
FIG. 2 is a configuration block diagram of a reporting server according to the exemplary embodiment.

FIG. 2 is a configuration block diagram of the reporting server 12. The reporting server 12 is configured from one or more server computers and includes one or more CPUs 12*b*, a ROM 12*c*, a RAM 12*d*, a communication interface (I/F) 12*e*, an input/output I/F 12*f*, and a storage 12*g*.

The one or more CPUs 12*b* implement various functions in such a manner as to read an appropriate program stored in the ROM 12*c* or the storage 12*g* and use the RAM 12*d* as a working memory. The one or more CPUs 12*b* implement the captured-image acquisition unit 14, the location-information decision unit 16, the danger assessment unit 18, the urgency decision unit 20, and the report controller 22 in FIG. 1.

The communication I/F 12*e* receives the vicinity image transmitted from the user terminal 10 and the location information. The communication I/F 12*e* outputs the received vicinity image and location information to the one or more CPUs 12*b*. The communication I/F 12*e* also transmits, to the user terminal 10, display data regarding the report button and the report addressee.

The input/output I/F 12*f* transmits and receives data to and from an input device such as a keyboard or a mouse and an output device such as a display.

The storage 12*g* is configured from a non-volatile memory such as a hard disk drive (HDD) or a solid state drive (SSD). The storage 12*g* stores not only programs but also image data, caption data, a report addressee table, and a reporting method table. The storage 12*g* implements the database 24 in FIG. 1.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Hereinafter, processing in this exemplary embodiment will be described in detail.

Figure 3:
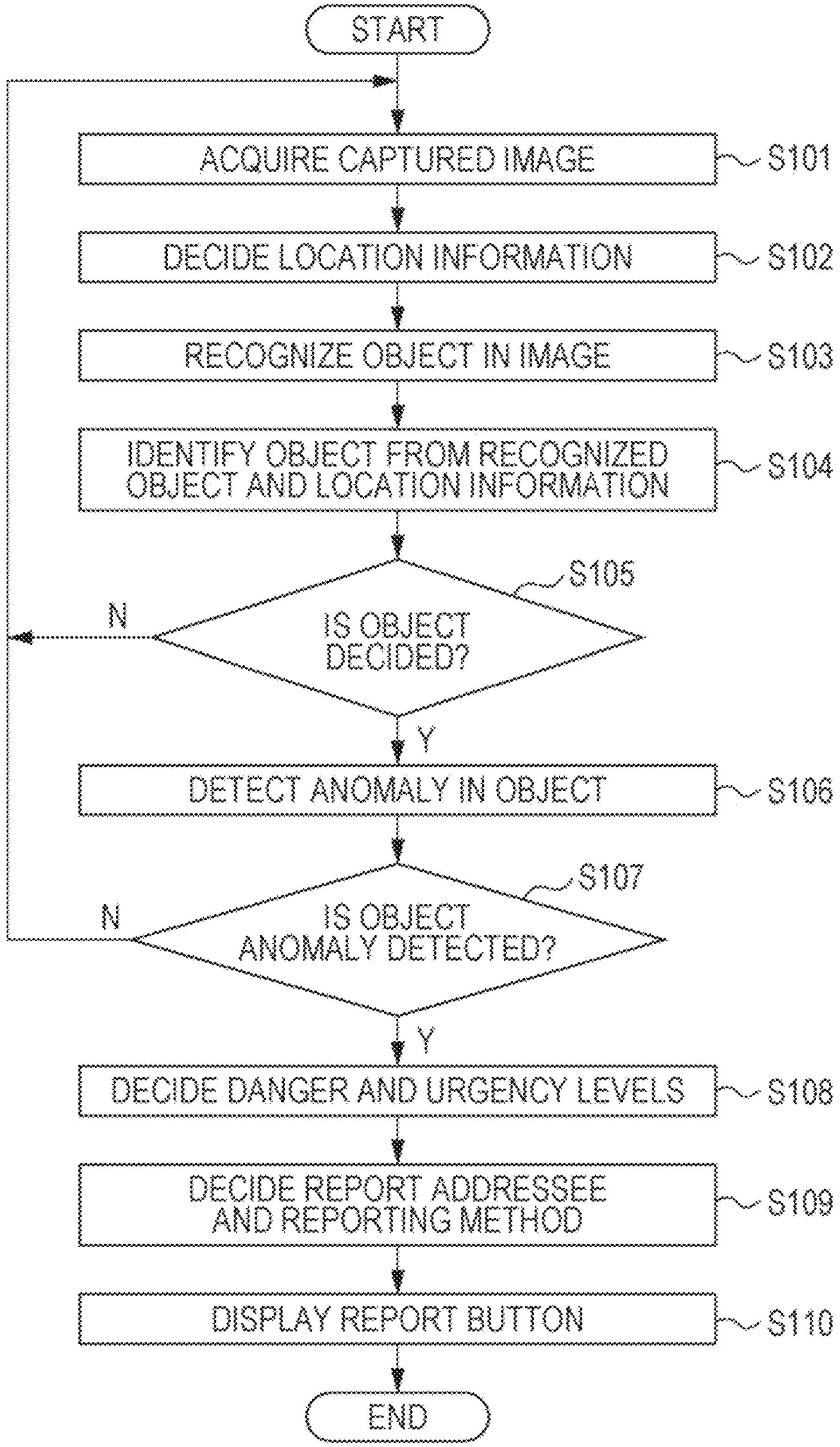
FIG. 3 is a processing flowchart of the exemplary embodiment.

FIG. 3 is a processing flowchart of this exemplary embodiment and illustrates processing performed by any of the CPUs 12*b* of the reporting server 12. A client application program for performing the reporting service in this exemplary embodiment has been installed in the user terminal 10 from the reporting server 12 or a different server.

First, the CPU 12*b* acquires an image captured by the user terminal 10, that is, a vicinity image (S101).

The CPU 12*b* then decides location information on the basis of the location information acquired by the user terminal 10 (S102). As described above, the location information represents location information regarding the user terminal 10 or an object in the vicinity image; however, the location information regarding the user terminal 10 acquired by a GPS installed in the user terminal 10 is herein taken as an example in the description.

The CPU 12*b* then recognizes an object from the acquired vicinity image (S103). In this processing, the shape and outline of the object included in the image may be recognized. The object includes a structure, an animal, and a person.

The CPU 12*b* then identifies the object from the object recognized in step S103 and the location information decided in step S102 (S104). Specifically, the CPU 12*b* identifies what the recognized object is on the basis of the object and map information corresponding to the decided location information. For example, if the recognized object has a bridge shape, and if a bridge is present in the map information corresponding to the location information regarding the user terminal 10, the CPU 12*b* identifies the object as a bridge. If the recognized object is an opening, and if a road is present in the map information corresponding to the location information regarding the user terminal 10, the CPU 12*b* identifies the object as the subsidence of the road. Further, if the recognized object is a large animal, and if the map information corresponding to the location information regarding the user terminal 10 indicates an urban area, the CPU 12*b* identifies the object as a large animal appearing in the urban area.

The object is identified in step S104 from the recognized object and the decided location information but may be identified from the recognized object without using the location information. For example, the recognized object has a human shape, the object may be identified as a person. In addition, if the recognized object is inferred as a bear, a wild boar, or the like on the basis of the shape or movement of the object, the object may be identified as a bear or a wild boar. Further, if the recognized object has a building shape and is inferred as a fire, the object may be identified as a fire of the building.

Even if the object is identified without using the location information, the location information may be used supplementally to improve the object identification accuracy. For example, if the recognized object is a bear or a wild boar, but if a zoo is present in the map information corresponding to the location information regarding the user terminal 10, the accuracy in identifying as a bear or a wild boar in the zoo, not as a wild bear or boar, may be improved.

The CPU 12*b* then determines whether the CPU 12*b* identifies the object (S105). If the CPU 12*b* does not identify the object, step S101 and subsequent steps are repeated (NO in S105). If the CPU 12*b* identifies the object (YES in S105), the CPU 12*b* detects an anomaly in the identified object (S106).

In a case where the state of the object is different from the normal state, an anomaly in the object is detected. The normal state of the object is decided on a per-object basis. If the object is a structure, a state where the original structure of the structure is kept is the normal state. If the state is different from the normal state, for example, if a bridge is damaged, or if a building is on fire, an anomaly is detected. In addition, in the normal state in an urban area and suburbs thereof, a wild animal such as a bear or a wild boar is not present. If the state of the urban area and suburbs thereof is different from the normal state, for example, if a wild animal is present in the urban area and suburbs thereof except a zoo, an anomaly is detected. Whether the object is anomalous may be determined from the vicinity image, without using the location information. For example, if an animal is identified as the object, but if the image processing proves that the animal is obviously in the cage, the animal is not a wild animal, and thus the absence of an anomaly may be detected. As a matter of course, as described above, further using the location information may lead to improvement in anomaly detection accuracy (for example, if the presence of an animal in the cage is detected in the image processing, and if the location of the animal is a zoo, a safari park, or the like, the absence of an anomaly is detected).

Whether the object is anomalous may be determined by using, for example, artificial intelligence (AI) using a trained model. The trained model is generated by performing learning by using learning data in advance in the following manner. If an image including an anomalous object is input, the presence of an anomaly is determined. If a normal image is input, the absence of an anomaly is determined. A vicinity image is then input in the trained model, and inferred values representing respective anomaly probabilities are defined. Specifically, the inferred values are defined in a range from 0 to 1, with an extraordinarily low probability and an extraordinarily high probability of the presence of anomaly being respectively set as 0 and 1. An output inferred value is compared with a threshold. If the output inferred value is higher than or equal to the threshold, the presence of an anomaly is detected.

The trained model may be configured from, for example, a neural network. Learning data or training data used for the learning are provided as a pair of a multidimensional vector to be input in the network and a target value to be output from the neural network for the multidimensional vector. The neural network may be a feedforward neural network in which a signal propagates in order from an input layer to an output layer. The neural network may be implemented by a graphics processing unit (GPU), a field programmable gate array (FPGA), or in cooperation with any of these and a CPU. The neural network is, for example, a deep neural network and is stored in a volatile memory or a non-volatile memory.

The CPU 12*b* or a different dedicated processor processes an input signal by using the deep neural network stored in the memory and outputs a processing result as an output signal. The deep neural network is a publicly known network and includes an input layer, an intermediate layer, and an output layer. The input layer receives an input signal. The intermediate layer is composed of multiple layers and processes input signals serially. The output layer outputs an output signal on the basis of the output from the intermediate layer. Each layer has multiple neurons (units), and an activation function causes the layer to serve as an activated neuron.

In the deep neural network learning, learning data is input, and loss is calculated from a difference between a desired value for the learning data and an output value. Back propagation is performed on the calculated loss in the neural network, and a parameter for the deep neural network, that is, a weight vector is adjusted. Next learning data is input in the deep neural network given the adjusted weighting, and loss is calculated again from a difference between the newly output value and the desired value. Back propagation is performed on the recalculated loss in the neural network, and the weight vector of the deep neural network is adjusted again. The steps above are repeated, and thereby the weight vector of the deep neural network is optimized. The weight vector is initialized to a certain value at the beginning and converges into an optimum value in such a manner that the learning is repeated.

If the CPU 12*b* detects an object anomaly, the CPU 12*b* further detects the level of the anomaly. For example, for a building fire or a structure damage, the anomaly level is detected on the basis of three levels of Major, Medium, and Minor. For an animal, the anomaly level is detected on the basis of four levels of Moving, Dormant, Trapped, and Dead. Moving, Dormant, Trapped, Dead, and the like may also be said to be the states of an anomaly. Further, for a person, the anomaly level is detected, for example, on the basis of whether they bleed or respire. The anomaly level may also be assessed on the basis of how high the inferred value described above is.

The CPU 12*b* then determines whether an object anomaly is detected (S107). If an object anomaly is not detected, step S101 and subsequent steps are repeated (NO in S107). If an object anomaly is detected (YES in S107), the CPU 12*b* decides the danger level and the urgency level of the anomaly (S108).

In response to the detection of an anomaly in the identified object, the CPU 12*b* decides a danger level and an urgency level on the basis of the level of the anomaly. At this time, the CPU 12*b* may decide the danger level on the basis of the object, the location information, and the anomaly level.

The following are specific descriptions.

If the object is a building, and if an anomaly is detected because the building is on fire, the CPU 12*b* decides the danger level as High regardless of whether the anomaly level is Major, Medium, or Minor. As a matter of course, if the map information corresponding to the location information regarding the building indicates that the building is isolated, and if the level of the fire is Minor (substantially a small fire), the CPU 12*b* may decide that the danger level is Medium. Further, if the map information indicates that the building is uninhabited, the CPU 12*b* may decide that the danger level is Low.

If the object is a road, and if an anomaly is detected because the road has subsided, the CPU 12*b* decides the danger level on the basis of the level of the anomaly. If the subsidence is large, the CPU 12*b* decides the danger level as High. If the subsidence is of a medium size, the CPU 12*b* also decides the danger level as Medium. If the subsidence is small, the CPU 12*b* decides the danger level as Low.

If the object is a bear, and if an anomaly is detected because the bear is present in a location other than a zoo, the CPU 12*b* decides the danger level on the basis of the level of the anomaly. If the bear is moving or alive, the CPU 12*b* decides the danger level as High. If the bear is dormant, the CPU 12*b* decides the danger level as Medium. If the bear is trapped, the CPU 12*b* decides the danger level as Low.

If the object is a wild animal, and if an anomaly is detected because the wild animal is present outside a hunting zone, the CPU 12*b* decides the danger level on the basis of the level of the anomaly. If the wild animal is moving, the CPU 12*b* decides the danger level as High. If the wild animal is dead, the CPU 12*b* decides the danger level as Low.

If the object is a person, and if an anomaly is detected because they are lying down on the road, the CPU 12*b* decides the danger level on the basis of the anomaly level of the person. If they lose much blood, the CPU 12_b_ decides the danger level as High. If they are not respiring, the CPU 12_b_ decides the danger level as High. If they lose relatively a little blood and are conscious, the CPU 12_b_ decides the danger level as Medium.

If the object is a building, and if an anomaly is detected because the building is on fire, the CPU 12_b_ decides the urgency level as High regardless of whether the anomaly level is Major, Medium, or Minor. As a matter of course, if the map information corresponding to the location information regarding the building indicates that the building is isolated, and if the level of the fire is Minor (substantially a small fire), the CPU 12_b_ may decide that the urgency level is Medium. Further, if the map information indicates that the building is uninhabited, the CPU 12_b_ may decide that the urgency level is Low.

If the object is a road, and if an anomaly is detected because the road has subsided, the CPU 12_b_ decides the urgency level on the basis of the level of the anomaly. If the subsidence is large, the CPU 12_b_ decides the urgency level as High. If the subsidence is of a medium size, the CPU 12_b_ also decides the urgency level as Medium. If the subsidence is small, the CPU 12_b_ decides the urgency level as Low.

If the object is a bear, and if an anomaly is detected because the bear is present in a location other than a zoo, the CPU 12_b_ decides the urgency level on the basis of the level of the anomaly. If the bear is moving or alive, the CPU 12_b_ decides the urgency level as High. If the bear is dormant, the CPU 12_b_ decides the urgency level as Medium. If the bear is trapped, the CPU 12_b_ also decides the urgency level as High.

If the object is a wild animal, and if an anomaly is detected because the wild animal is present outside a hunting zone, the CPU 12_b_ decides the urgency level on the basis of the level of the anomaly. If the wild animal is moving, the CPU 12_b_ decides the urgency level as High. If the wild animal is dead, the CPU 12_b_ decides the urgency level as Medium.

If the object is a person, and if an anomaly is detected because they are lying down on the road, the CPU 12_b_ decides the urgency level on the basis of the anomaly level of the person. If they lose much blood, the CPU 12_b_ decides the urgency level as High. If they are not respiring, the CPU 12_b_ decides the urgency level as High. If they lose relatively a little blood and are conscious, the CPU 12_b_ decides the urgency level as Medium.

The danger level and the urgency level have a correlation to some extent. The higher the danger level, the higher the urgency level. However, note that the danger level and the urgency level do not necessarily match in some cases. For example, if the object is a bear, and if the anomaly level is Trapped, it may be decided that the danger level is Low but the urgency level is High. If the object is a wild animal, and if the anomaly level (or the state of the anomaly) is Dead outside a hunting zone, it may be decided that the danger level is Low but the urgency level is High. The danger level and the urgency level are respectively used as parameters to select a report addressee and a reporting method.

The CPU 12_b_ then decides a report addressee and a reporting method by using the danger level and the urgency level decided in step S108 (S109). Specifically, the CPU 12_b_ decides the report addressee for the decided danger level and the reporting method for the decided urgency level with reference to the report addressee table and the reporting method table stored in the storage 12_g_.

Report addressees are each set in advance in the report addressee table in association with an object, a location, an anomaly level, and a danger level and include a local government and a public works office. Each report addressee further includes a police station and a fire station. Specifically, if the object is a structure, and if the danger level is High because the anomaly level is Major fire, a police station or a fire station having jurisdiction over the location of the building is decided as the report addressee. If the object is a road, and if the danger level is High because the anomaly level is Major damage, a police station having jurisdiction over the road damage location is decided as the report addressee. If the object is a road, and if the danger level is Low because the anomaly level is Minor damage, a local government or a public works office having jurisdiction over the location of the road damage is decided as the report addressee. Further, if the object is a bear, and if the danger level is Low because the anomaly level is Trapped, the local government having jurisdiction over the location is decided as the report addressee.

Reporting methods are each set in advance in the reporting method table in association with the urgency level and mainly include telephone, e-mail, or a message or chat in a SNS. If the urgency level is High, telephone is decided as the reporting method. If the urgency level is Medium or Low, telephone, e-mail, or a message or chat in a SNS is decided as the reporting method.

After the report addressee and the reporting method are decided, the CPU 12_b_ transmits display control data to the user terminal 10 to display the report button (S110).

In the display control data, an ID for identifying a user terminal 10 having transmitted the vicinity image, a report addressee decided on the basis of the vicinity image, and a reporting method are associated with each other. In response to the transmission of a signal representing the operation of the report button from the user terminal 10, the report addressee and the reporting method for the report button are decided, and automatic reporting is performed.

For the user who operates the user terminal 10, in response to capturing an image of the state of an anomalous state near the user with the camera of the user terminal 10 and transmitting the image to the reporting server 12, the report button is displayed on the user terminal 10 under the control of the reporting server 12. By operating the report button, reporting to an appropriate report addressee by an appropriate reporting method may be performed easily and reliably.

Screens displayed on the display of the user terminal 10 will then be described.

Figure 4A:
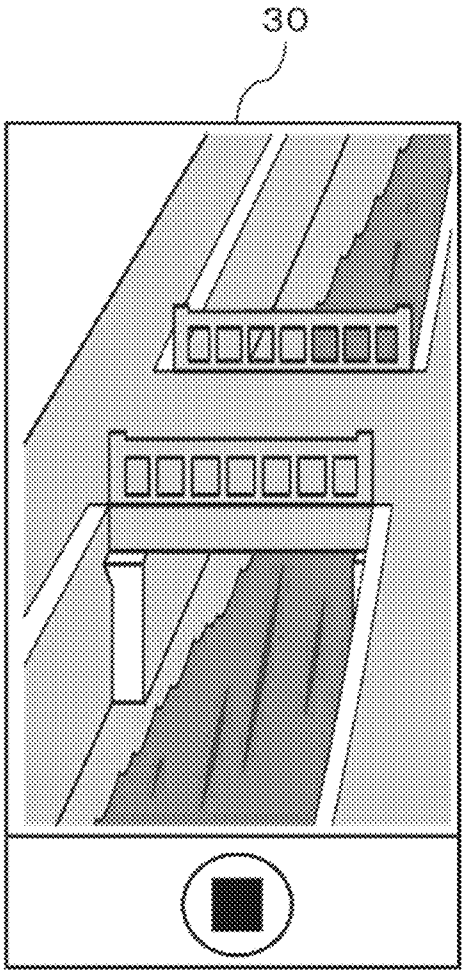
FIGS. 4A and 4B are each a schematic view of an example screen of a user terminal according to the exemplary embodiment (No. 1)
Figure 4B:
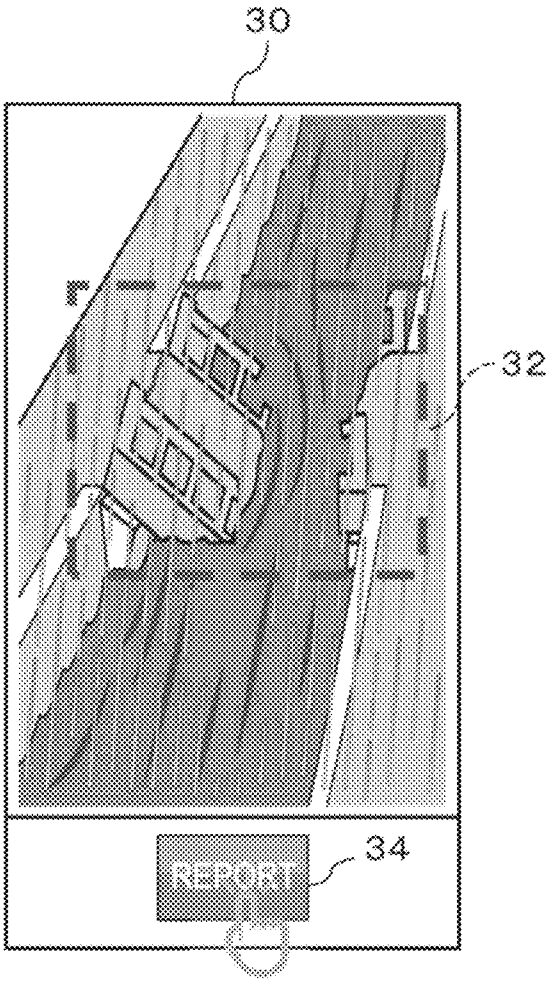

FIGS. 4A and 4B each illustrate an example screen of a display 30 displaying an image of the bridge over the river, the image being captured as a vicinity image. FIG. 4A illustrates a normal state, and FIG. 4B illustrates a state in which the bridge has a major damage.

Even if the image in FIG. 4A is transmitted to the reporting server 12, a particular process is not executed because the reporting server 12 identifies the bridge as an object but does not detect an anomaly. Accordingly, the report button is not displayed on the display 30 of the user terminal 10.

In contrast, if the image in FIG. 4B is transmitted to the reporting server 12, the reporting server 12 identifies the bridge as an object, detects an anomaly of the bridge, decides a high danger level and a high urgency level, respectively decides a local government having jurisdiction over the location of the bridge and telephone as a report addressee and a reporting method, and transmits, to the user terminal 10, display control data for the report button. The user terminal 10 thus receives the display control data and displays a REPORT button 34 on the display 30.

At this time, together with the display control data for the report button, the reporting server 12 may transmit, to the user terminal 10, display control data for displaying a mark 32 identifying the object having the detected anomaly. In this case, the user terminal 10 displays, on the display 30, not only the REPORT button 34 but also the mark 32 indicating the object having the detected anomaly.

When looking at the mark 32, the user operating the user terminal 10 may easily comprehend the object having the detected anomaly. In addition, by operating the displayed REPORT button 34, the user may report to an appropriate report addressee by an appropriate reporting method. Specifically, in response to the user operating the REPORT button 34 displayed on the display 30, an operation signal is transmitted to the reporting server 12. The reporting server 12 decides the report addressee and the reporting method associated with the REPORT button 34 from the operation signal and automatically reports to the decided report addressee by the decided reporting method. In other words, the user may report to the decided report addressee by operating the report button, without inputting information regarding the report addressee, such as the phone number or the e-mail address of the report addressee. In this case, reporting to the local government having jurisdiction over the bridge is performed by telephone.

If automatic reporting is performed to the report addressee decided by the reporting server 12 by the decided reporting method, information indicating that the reporting to the decided report addressee has been performed and information regarding the reporting are preferably transmitted back from the reporting server 12 to the user terminal 10.

Figure 5A:
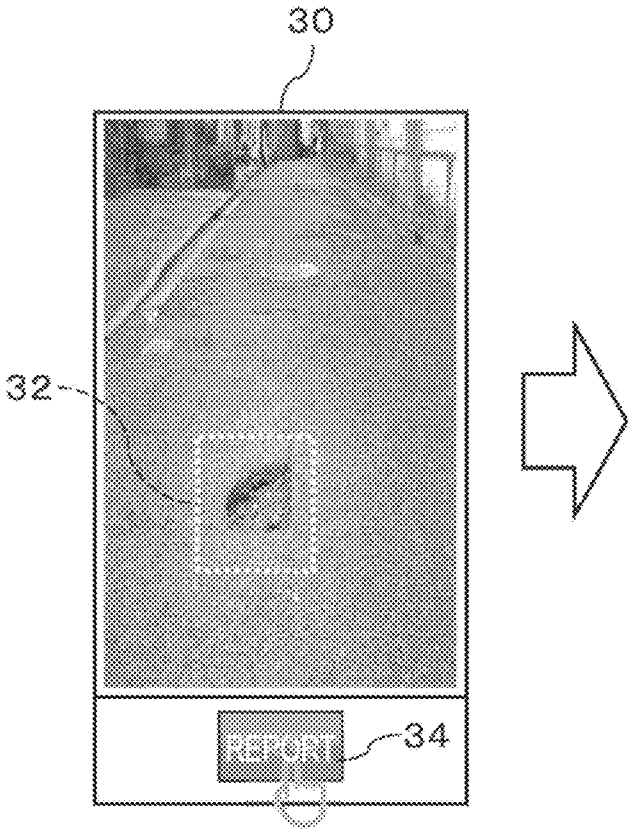
FIGS. 5A and 5B are each a schematic view of an example screen of the user terminal according to the exemplary embodiment (No. 2)
Figure 5B:
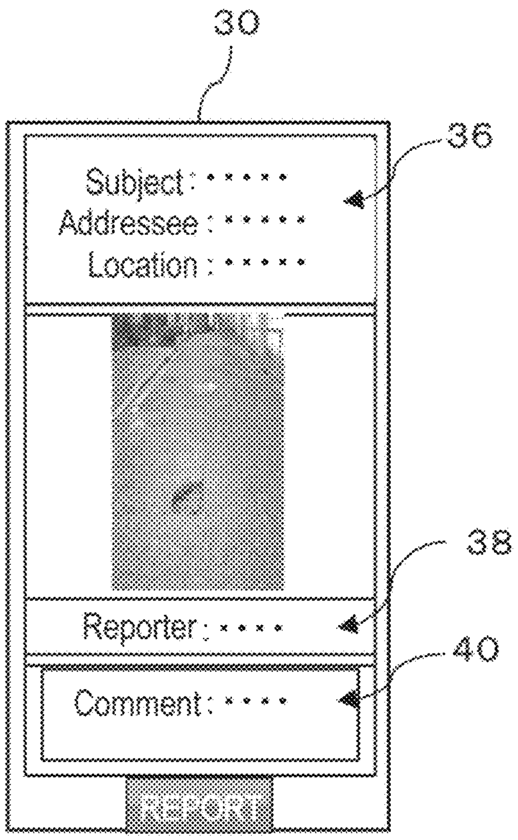

FIGS. 5A and 5B each illustrate an example screen of the display 30 displaying an image of the subsidence of a road, the image being captured as a vicinity image. FIG. 5A illustrates a state where the mark 32 and the REPORT button 34 are displayed after the display control data is received from the reporting server 12, and FIG. 5B illustrates a state after the REPORT button 34 is operated.

As illustrated in FIG. 5B, in response to the operation of the REPORT button 34, before automatically reporting to the decided report addressee by the decided reporting method, the reporting server 12 displays, on the user terminal 10, data regarding an input form for transmitting additional information required for the reporting. The user terminal 10 receives the data regarding the input form transmitted from the reporting server 12 and displays the input form on the display 30. The input form has, for example, the following input fields:

Subject;

Addressee;

Location;

Reporter; and

Comment. The report addressee has been decided by the reporting server 12 and thus may be displayed as already being input. The same holds true for the subject and the location. The user checks the subject, the report addressee, and the location, inputs required information in the reporter and comment input fields, and then operates the REPORT button 34 again. The reporting server 12 reports to the report addressee in accordance with the input form transmitted from the user terminal 10. The input form illustrated in FIG. 5B may be effective when the reporting method is e-mail or a message or chat in a SNS.

Figure 6A:
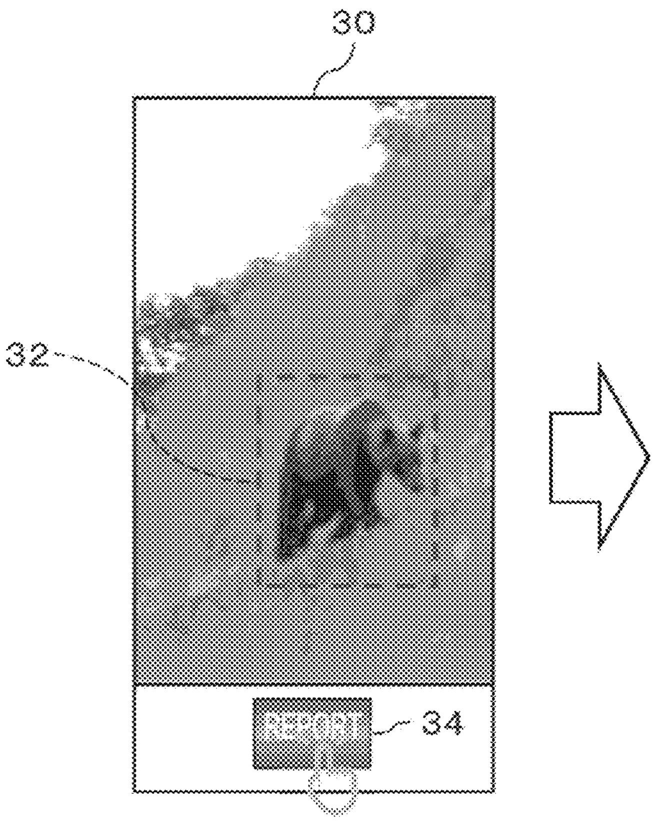
FIGS. 6A and 6B are each a schematic view of an example screen of the user terminal according to the exemplary embodiment (No. 3)
Figure 6B:
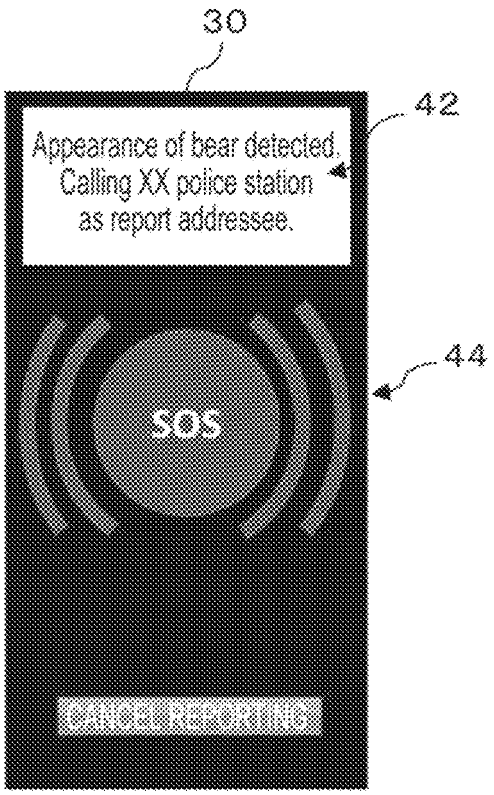

FIGS. 6A and 6B each illustrate an example screen of the display 30 displaying an image of a bear appearing in the suburbs of the urban area, the image being captured as a vicinity image. FIG. 6A illustrates a state where the mark 32 and the REPORT button 34 are displayed after the display control data is received from the reporting server 12, and FIG. 6B illustrates a state after the REPORT button 34 is operated.

As illustrated in FIG. 6B, in response to the operation of the REPORT button 34, the reporting server 12 automatically reports to a police station serving as the decided report addressee by telephone serving as the decided reporting method. In response to this, information indicating the reporting is displayed on the display 30 of the user terminal 10. Specifically, a message 42 indicating the following is displayed.

"Appearance of bear detected.

Calling XX police station as report addressee". In addition to this, a mark 44 representing SOS indicating that a call is being made is also displayed. When looking at the screen, the user may verify that the reporting to the police station has been performed.

When identifying an object from the vicinity image and then detecting an object anomaly, the reporting server 12 may detect not only an anomaly in one object but also anomalies in objects. Example screens displayed when anomalies in objects are detected will then be described.

Figure 7A:
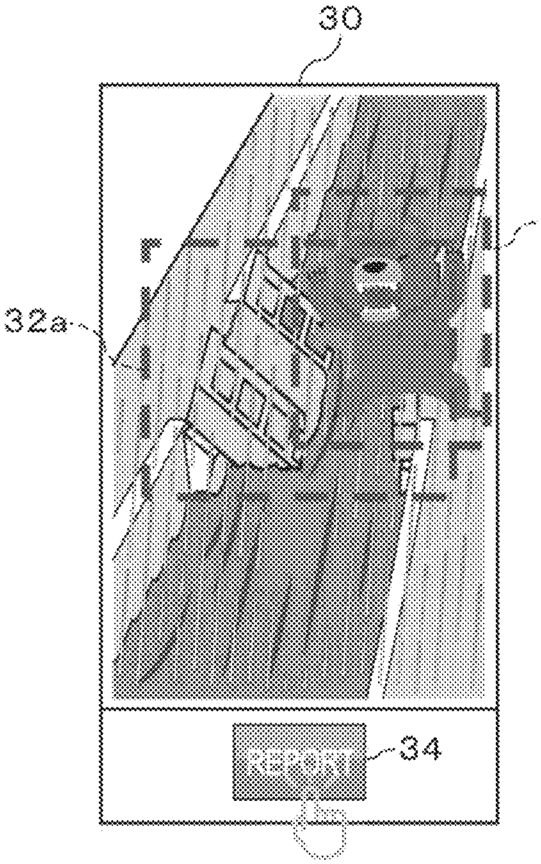
FIGS. 7A and 7B are each a schematic view of an example screen of the user terminal according to the exemplary embodiment (No. 4)
Figure 7B:
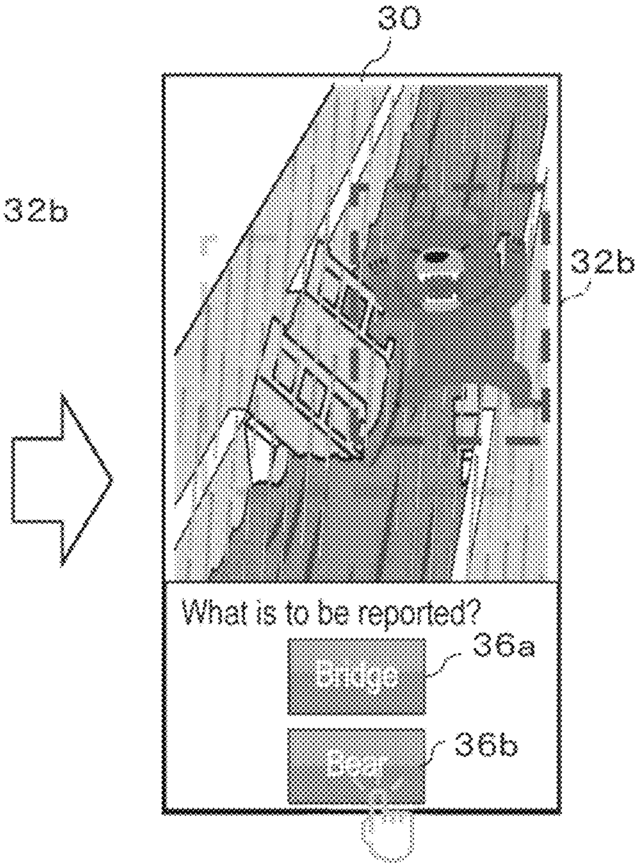

FIGS. 7A and 7B each illustrate an example screen of the display 30 displaying an image of a bear appearing on the bridge over the river, the image being captured as a vicinity image. FIG. 7A illustrates a state where two marks 32*a* and 32*b* and the REPORT button 34 are displayed after the display control data is received from the reporting server 12. The reporting server 12 identifies the bridge and the bear as objects, detects anomalies in the respective objects, and causes the mark 32*a* representing the bridge and the mark 32*b* representing the bear to be displayed on the display 30 of the user terminal 10.

FIG. 7B illustrates a state after the REPORT button 34 in FIG. 7A is operated. Since the objects having the detected anomalies are the bridge and the bear, the reporting server 12 causes a Bridge button 36*a* and a Bear button 36*b* for selecting one of these to be displayed on the display 30 of the user terminal 10, in response to receiving a signal representing the operation of the REPORT button 34. The bridge is associated with a specific report addressee and a specific reporting method, and the bear is also associated with a specific report addressee and a specific reporting method. When determining that a damage to the bridge is more dangerous and more urgent, the user operates the Bridge button 36*a*. When determining that the appearance of the bear is more dangerous and more urgent, the user operates the Bear button 36*b*. The reporting server 12 automatically reports to the decided report addressee by the decided reporting method in response to the operation signal from the user terminal 10.

Figure 8A:
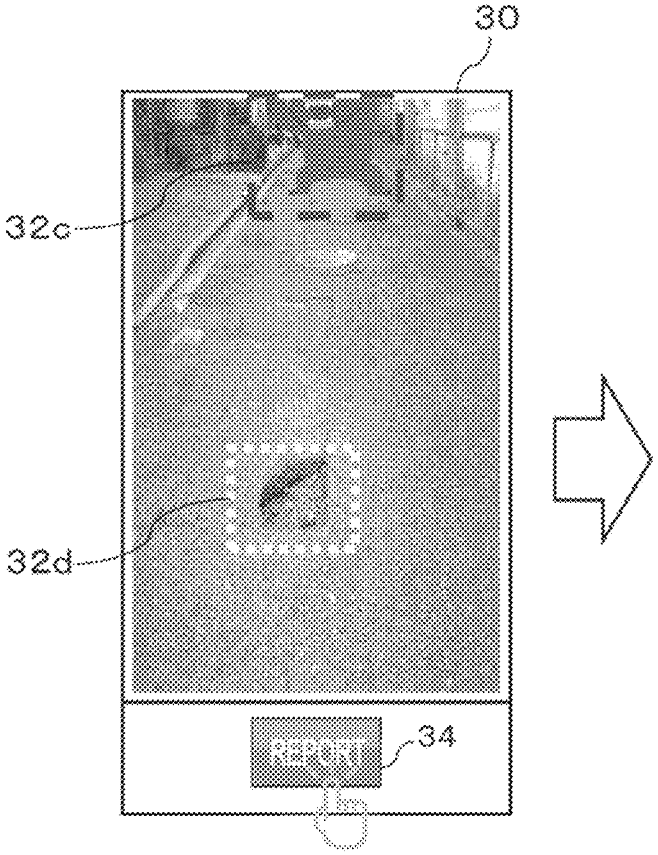
FIGS. 8A and 8B are each a schematic view of an example screen of the user terminal according to the exemplary embodiment (No. 5)
Figure 8B:
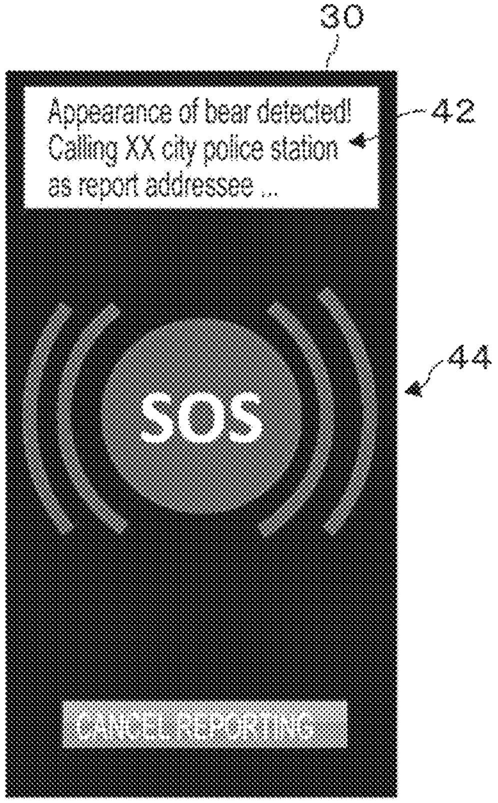

FIGS. 8A and 8B each illustrate an example screen of the display 30 displaying an image of a bear appearing near a road having subsided, the image being captured as a vicinity image. FIG. 8A illustrates a state where a mark 32*c* and the REPORT button 34 are displayed after the display control data is received from the reporting server 12. Since the objects having the detected anomalies are the road subsidence and the bear, the reporting server 12 decides that the bear is more dangerous and more urgent according to predetermined priority and causes the mark 32*c* representing the bear to be displayed. For the road subsidence having the detected anomaly but decided as a low priority, a gray mark 32*d* representing identification as an object but not selection as an object to be reported.

FIG. 8B illustrates a state after the REPORT button 34 in FIG. 8A is operated. Like FIG. 6B, the message 42 and the SOS mark 44 are displayed and thereby indicate that reporting to a police station by telephone has been performed.

If the object anomalies are detected as described above, whether the user is caused to select one of the object anomalies to be reported or the reporting server 12 is to report one of the object anomalies according to the priority is automatically decided. The two options may also be combined. For example, if it is not possible to decide one of the object anomalies according to the priority (for example, there is no difference in priority), the user is caused to select one of the objects.

FIGS. 9A and 9B illustrate respective examples of the report addressee table and the reporting method table that are stored in the storage 12*g*.

FIG. 9A illustrates the report addressee table in which report addressees are each specified in association with an object, location information, an anomaly, and a danger level. Examples thereof include the following.

Object: AA building
Location information: XXX
Anomaly: Fire
Danger level: High
Report addressee: AA police
Object: Bear
Location information: CCC
Anomaly: Trapped
Danger level: Low
Report addressee: CC city office The report addressee table may also function as a table referred to in deciding the danger level in step S108 in FIG. 3. If the CPU 12*b* decides an object anomaly, the CPU 12*b* may decide the danger level associated with the anomaly level of the object by referring to the report addressee table.

Priority may be added to the report addressee table in FIG. 9A. Specifically, for example, priority is given to the appearance of a bear over a road subsidence, and priority is given to a fire over the road subsidence.

FIG. 9B illustrates the reporting method table in which the reporting methods are each specified in association with an object, location information, an anomaly, and an urgency level. Examples thereof include the following.

Object: AA building
Location information: XXX
Anomaly: Fire
Urgency level: High
Reporting method: Telephone
Object: bear
Location information: CCC
Anomaly: Trapped
Urgency level: High
Reporting method: Telephone The reporting method table may also function as a table referred to in deciding the urgency level in step S108 in FIG. 3. If the CPU 12*b* decides an object anomaly, the CPU 12*b* may decide the urgency level associated with the anomaly level of the object by referring to the reporting method table.

The exemplary embodiment of the present disclosure has heretofore been described. The present disclosure is not limited to the exemplary embodiment, and various modifications may be made thereto.

For example, in this exemplary embodiment, the reporting system including the user terminal 10 and the reporting server 12 is described taken as an example as illustrated in FIG. 1; however, the user terminal 10 may have the functions of the reporting server 12, and the processor of the user terminal 10 may perform the processing in FIG. 3. In this case, the user terminal 10 serves as a reporting apparatus having the functions of the reporting server 12 in FIG. 1.

Figure 10:
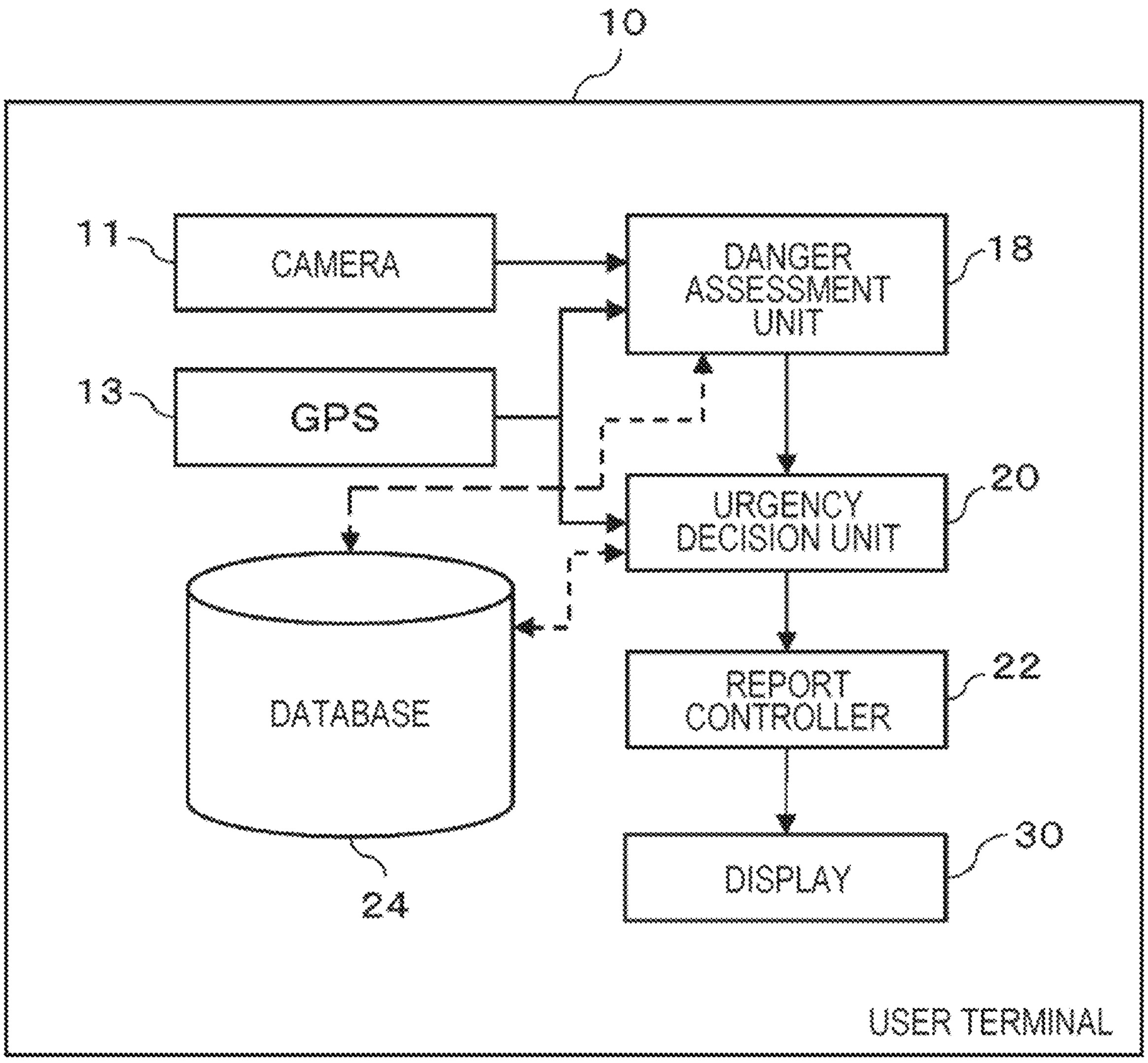
FIG. 10 is a functional block diagram of a user terminal according to a modification.

FIG. 10 illustrates the configuration of the user terminal 10 according to a modification of the exemplary embodiment. The user terminal 10 has the functional blocks of the reporting server 12 in addition to a camera 11, a GPS 13, and the display 30. The report controller 22 displays, on the display 30, the report button for a report addressee and a reporting method that are decided.

In this exemplary embodiment, an object anomaly is detected by using the vicinity image (a still image or a moving image). In addition to this, sound around the user terminal 10 may be recorded with the microphone of the user terminal 10 and may be transmitted together with the vicinity image to the reporting server 12. The reporting server 12 processes the ambient sound in addition to the vicinity image and thereby detects an object anomaly. For example, a fire of a building is accompanied by sound specific to a fire, and thus identifying the sound enables an anomaly in a building and the level thereof to be assessed. In a case of a wild animal, processing a cry thereof enables the wild animal to be identified and further enables the state to be assessed accurately.

If the user terminal 10 transmits, to the reporting server 12, a moving image near the user terminal 10 captured with the user terminal 10, the moving image includes sound data. An object anomaly may thus be detected by using the sound data, and the anomaly level thereof may be assessed.

For example, if an avalanche of rocks and earth occurs, the magnitude of the avalanche of rocks and earth may be assessed by using sound data included in a moving image of the avalanche of rocks and earth.

If a specific person behaves in a suspicious manner in the public transportation system such as the train, the behavior of the person may be comprehended correctly from sound data included in the moving image, and an anomaly level may thus be assessed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A reporting apparatus comprising:
an image acquisition unit that acquires an image near the reporting apparatus;
a location acquisition unit that acquires a location of an object;
a processor configured to, by running a program:
detect the object included in the image, the object being at least one of a structure, a wild animal, or a person;
assess a danger level or an urgency level of the object on a basis of the location of the object;
determine whether the object is dangerous on a basis of a state of the object; and in response to determining that the object is dangerous on the basis of the state of the object, display, on a display, a report button for reporting to a report addressee associated with the object.

2. The reporting apparatus according to claim 1, wherein in response to determining that the object is not dangerous on the basis of the state of the object, the report button is not displayed.

3. The reporting apparatus according to claim 2, further comprising:

a sound acquisition unit that acquires sound around the reporting apparatus, wherein the processor is configured to further assess the danger level or the urgency level of the object on a basis of the sound.

4. The reporting apparatus according to claim 3, wherein the processor is configured to change a reporting method on a basis of the urgency level.

5. The reporting apparatus according to claim 3, wherein the processor is configured to change the report addressee on a basis how high the danger level is.

6. The reporting apparatus according to claim 1, further comprising:

a sound acquisition unit that acquires sound around the reporting apparatus, wherein the processor is configured to further assess the danger level or the urgency level of the object on a basis of the sound.

7. The reporting apparatus according to claim 6, wherein the processor is configured to change a reporting method on a basis of the urgency level.

8. The reporting apparatus according to claim 6, wherein the processor is configured to change the report addressee on a basis how high the danger level is.

9. The reporting apparatus according to claim 1, wherein the processor is configured to change a reporting method on a basis of the urgency level.

10. The reporting apparatus according to claim 1, wherein the processor is configured to change the report addressee on a basis how high the danger level is.

11. The reporting apparatus according to claim 1, wherein the processor is configured to highlight the object determined to be dangerous on the display.

12. The reporting apparatus according to claim 1, wherein the processor is configured to, in response to presence of a plurality of objects determined to be dangerous, decide one of a plurality of report addressees.

13. The reporting apparatus according to claim 1, wherein the processor is configured to, in response to presence of a plurality of objects determined to be dangerous, decide a plurality of report addressees associated with the respective objects.

14. The reporting apparatus according to claim 1, wherein the report addressee includes at least one of a local government or a public works office.

15. The reporting apparatus according to claim 14, wherein the report addressee further includes at least one of police or a fire station.

16. A non-transitory computer readable medium storing a program causing a computer to execute a process comprising:

detecting an object included in an image near the computer, the object being at least one of a structure, a wild animal, or a person;

acquiring a location of the object;

assessing a danger level or an urgency level of the object on a basis of the location of the object;

determining whether the object is dangerous on a basis of a state of the object; and in response to determining that the object is dangerous, displaying, on a display, a report button for reporting to a report addressee associated with the object.

17. A method for reporting comprising:

detecting an object included in an image near a computer, the object being at least one of a structure, a wild animal, or a person;

acquiring a location of the object;

assessing a danger level or an urgency level of the object on a basis of the location of the object;

determining whether the object is dangerous on the basis of a state of the object; and in response to determining that the object is dangerous, displaying, on a display, a report button for reporting to a report addressee associated with the object.

* * * * *